(12) United States Patent
Richman et al.

(10) Patent No.: US 11,334,654 B2
(45) Date of Patent: May 17, 2022

(54) DYNAMIC ENHANCED SECURITY BASED ON BIOMETRIC AUTHENTICATION

(71) Applicant: Bank of America Corporation, Charlotte, NC (US)

(72) Inventors: Adam B. Richman, Charlotte, NC (US); David Mortman, Worthington, OH (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/070,141

(22) Filed: Oct. 14, 2020

(65) Prior Publication Data

US 2022/0114244 A1 Apr. 14, 2022

(51) Int. Cl.
*G06F 21/32* (2013.01)
*G06F 3/041* (2006.01)
*G06V 40/50* (2022.01)
*G06V 40/12* (2022.01)

(52) U.S. Cl.
CPC ............ *G06F 21/32* (2013.01); *G06F 3/0412* (2013.01); *G06V 40/1365* (2022.01); *G06V 40/50* (2022.01)

(58) Field of Classification Search
CPC ... G06F 21/32; G06F 3/0412; G06K 9/00926; G06K 9/00087
See application file for complete search history.

(56) References Cited

U.S. PATENT DOCUMENTS

| | | | |
|---|---|---|---|
| 7,404,086 B2 | 7/2008 | Sands et al. | |
| 8,239,685 B2 | 8/2012 | Lee et al. | |
| 8,392,965 B2 | 3/2013 | Carter et al. | |
| 8,952,781 B2 | 2/2015 | Al-Azem et al. | |
| 9,654,468 B2 | 5/2017 | Buer | |
| 2002/0112177 A1 | 8/2002 | Voltmer et al. | |
| 2012/0260350 A1* | 10/2012 | Yamada | H04N 1/00411 726/28 |
| 2014/0096210 A1* | 4/2014 | Dabbiere | G06F 21/316 726/5 |
| 2014/0181959 A1* | 6/2014 | Li | G06F 21/32 726/19 |
| 2015/0371073 A1* | 12/2015 | Cho | G06F 3/0416 382/124 |

(Continued)

*Primary Examiner* — Edward F Urban
*Assistant Examiner* — Wassim Mahrouka
(74) *Attorney, Agent, or Firm* — Banner & Witcoff, Ltd.

(57) ABSTRACT

Systems for enhanced security using biometric controls are provided. A user may launch an application on a user device and one or more rules or instructions may be executed activating enhanced security functions for the application. As the user interacts with a touch screen display of the device, user input including biometric data may be captured. The biometric data may be compared to pre-stored biometric data of the user. If the biometric data matches the pre-stored data, the system may capture additional user input and biometric data and analyze that data to verify the user. If the biometric data does not match the pre-stored data, functionality and/or accessibility of the application may be modified. The system may continue to capture user input and/or biometric data and if the registered user's data is again recognized, the functionality and/or accessibility may again be modified to provide access to the registered user.

21 Claims, 12 Drawing Sheets

(56) References Cited

U.S. PATENT DOCUMENTS

| | | | |
|---|---|---|---|
| 2016/0065788 A1* | 3/2016 | Hosoda | H04N 1/4433 358/1.13 |
| 2016/0364591 A1* | 12/2016 | El-Khoury | G06F 3/04883 |
| 2017/0048240 A1* | 2/2017 | Chang | G06F 21/32 |
| 2018/0173867 A1* | 6/2018 | De | G06F 21/32 |
| 2021/0089636 A1* | 3/2021 | Lee | G06F 21/32 |

* cited by examiner

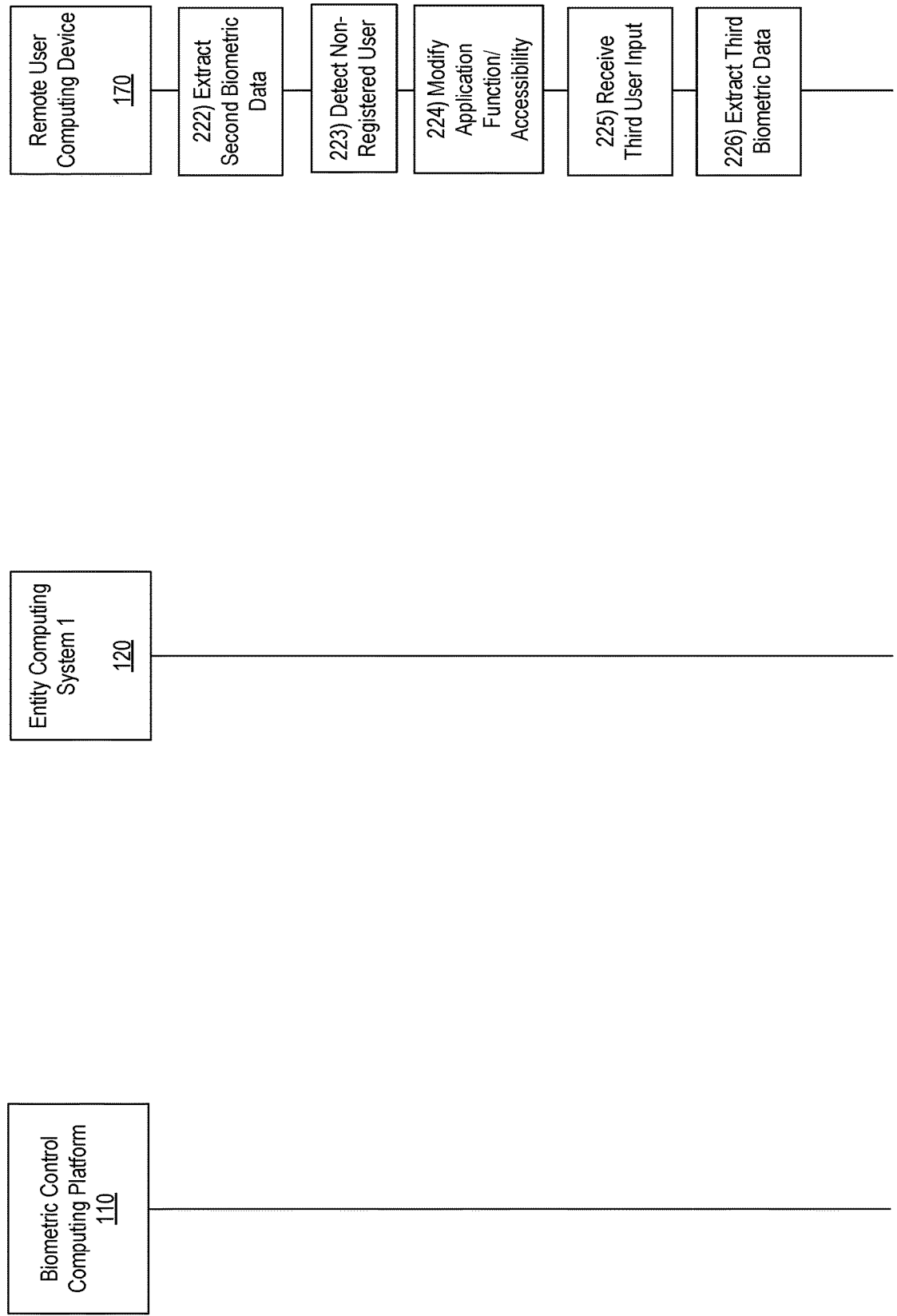

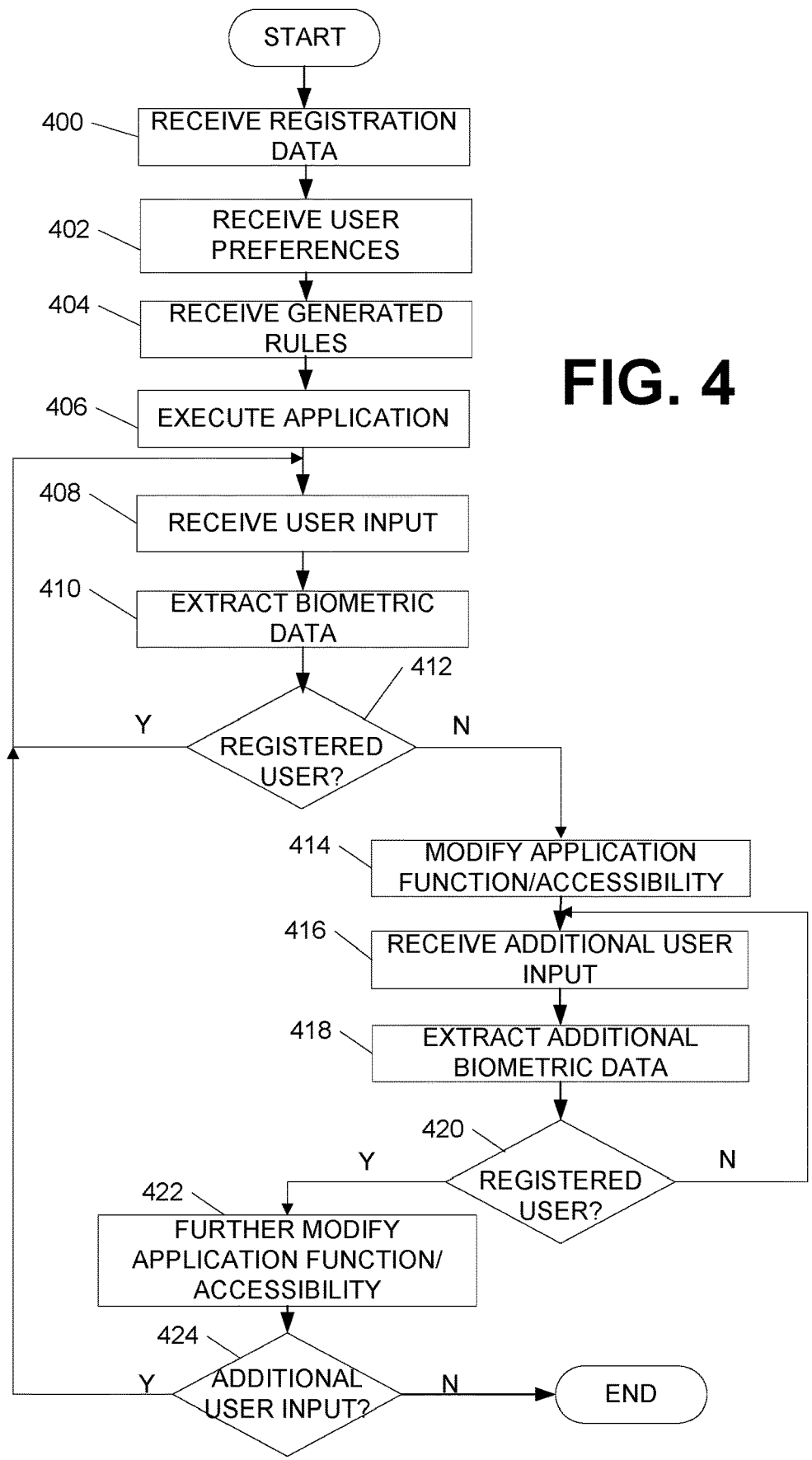

DYNAMIC ENHANCED SECURITY BASED ON BIOMETRIC AUTHENTICATION

BACKGROUND

Aspects of the disclosure relate to systems and devices performing enhanced security based on biometric authentication and tracking.

Privacy is a top concern for many people today. As people use their mobile devices more for processing transactions and other business, privacy and data security are becoming even more significant for users. Conventional systems may authenticate a user in order to permit access to an application. However, once the application is accessible, no further authentication or validation of the user may be conducted. This may enable unauthorized actors access the application and/or associated data without permission of a registered or authenticated user. Further, requiring repeated input of authentication data may be inconvenient to the user. Accordingly, aspects described herein relate to enhanced security using biometric authentication and tracking as a user is interacting with an application to evaluate and verify that a registered user is the user of the application.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated protecting user data and maintaining privacy of data as a user interacts with, for example, a mobile device.

In some examples, a user may launch an application on a user device, such as a mobile device. In some arrangements, the user may be authenticated in order to access the application and the application may be analyzed to determine whether enhanced security and biometric control functions apply to the application. If so, one or more rules or instructions may be executed enabling or activating enhanced security and/or biometric control functions for the application.

Accordingly, as the user interacts with, for example a touch screen display of the mobile device, user input data including biometric data such as fingerprint data may be captured. The biometric data may be extracted and compared to pre-stored biometric data of the user. If the biometric data matches the pre-stored data, the system may capture additional user input and biometric data and analyze that data to verify the user.

If the biometric data does not match the pre-stored data, functionality and/or accessibility of the application may be modified. For instance, the application may be moved to operate in a background of the mobile device to prevent the nonregistered user from accessing the application and/or data therein. The system may continue to capture user input and/or biometric data and if the registered user's data is again recognized, the functionality and/or accessibility may again be modified to provide access to the registered user.

Accordingly, the system may continuously, or at periodic or a-periodic time intervals, verify that the user interacting with an application is a registered user.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for implementing enhanced security and biometric control functions in accordance with one or more aspects described herein;

FIG. 4 depicts an illustrative method for implementing and using enhanced security and biometric control functions according to one or more aspects described herein;

DETAILED DESCRIPTION

Figure 1A:
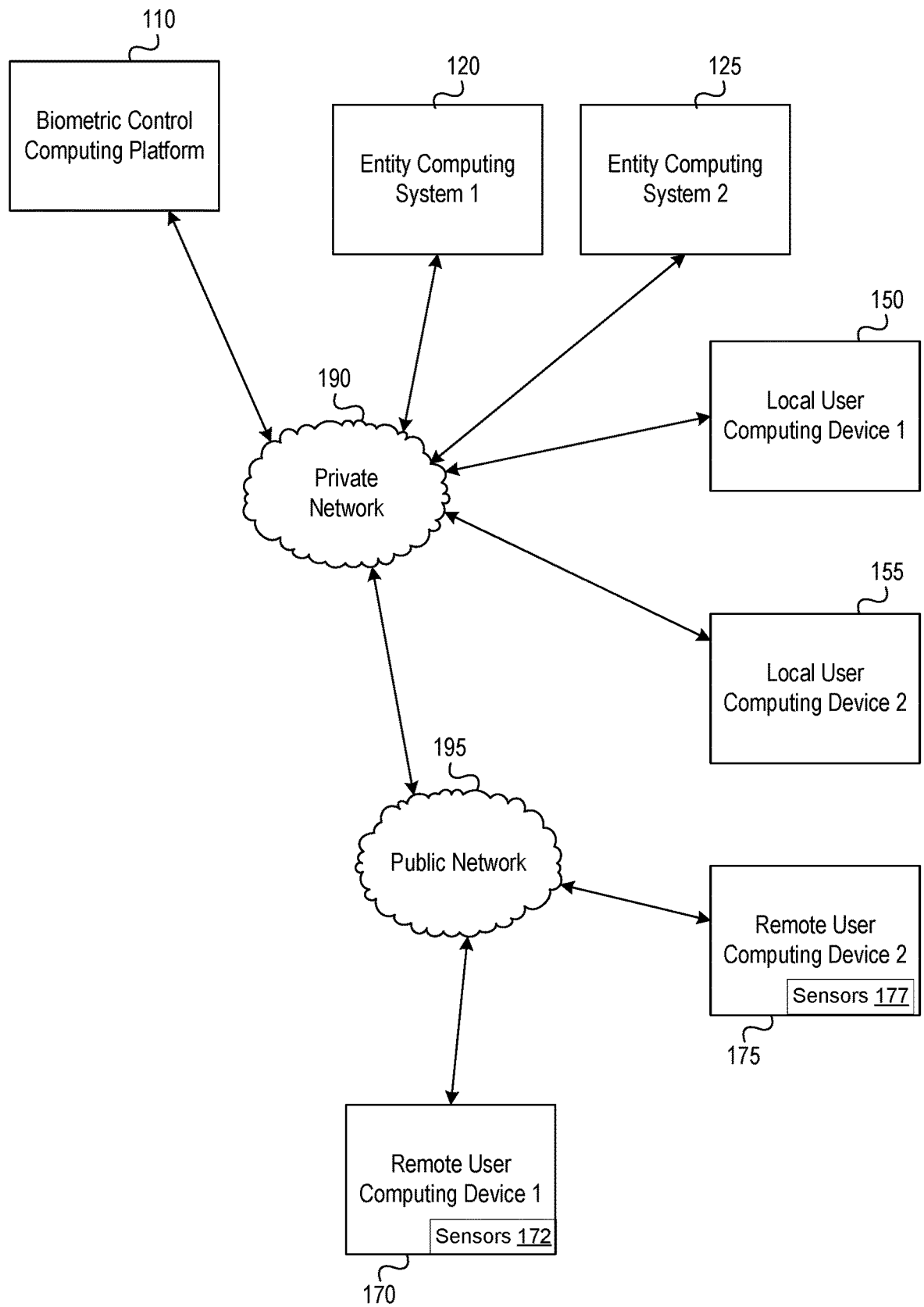
FIGS. 1A and 1B depict an illustrative computing environment for implementing enhanced security and biometric control functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, maintaining user data privacy and security is a top priority for both users and enterprise organizations. As users rely more heavily on their personal devices to conduct transactions, maintaining data privacy and security become even more critical.

Accordingly, as discussed herein, biometric controls may be used to aid in maintaining data privacy and security. As discussed, a user may register for enhanced security including, for example, biometric controls. The enhanced security may apply to all applications on a user device, or a portion thereof. In some examples, a user may identify particular application to apply enhanced security. Additionally or alternatively, one or more categories or types of applications may receive enhanced security.

Upon executing an application, if the application has enhanced security, one or more rules or instructions may be executed enabling or activating enhanced security functions. In some examples, this may include activating one or more sensing devices associated with a user device, such as a mobile device. In some arrangements, the user device may include one or more sensing devices configured to capture and/or analyze biometric data, such as fingerprint data, in any region or area of the touch screen display. For instance, the entire touch screen display, or a majority thereof, may include biometric sensing capabilities to capture, for example, fingerprint data as a user interacts with any portion of the touch screen display.

The captured biometric data may be compared to pre-stored data and, if a match exists, the system may capture and analyze additional user input and biometric data. This may be performed in the background such that a user is not required to further authenticate (e.g., after authenticating to access the application) but the system may protect the user and user data by verifying, continuously or at various time intervals, that the user is a registered user (e.g., without requiring additional user input).

If the biometric data does not match pre-stored data, functionality and/or accessibility of the application may be modified. For instance, the application may be moved to operate in a background of the device to prevent the non-registered user from accessing the application or data therein. The system may continue to capture and analyze user input and biometric data and, if biometric data of a registered user is again detected (e.g., after detecting a non-registered user and modifying functionality and/or accessibility of the application), the application may be further modified to provide full function or accessibility to the user.

These and various other arrangements will be discussed more fully below.

Figure 1B:
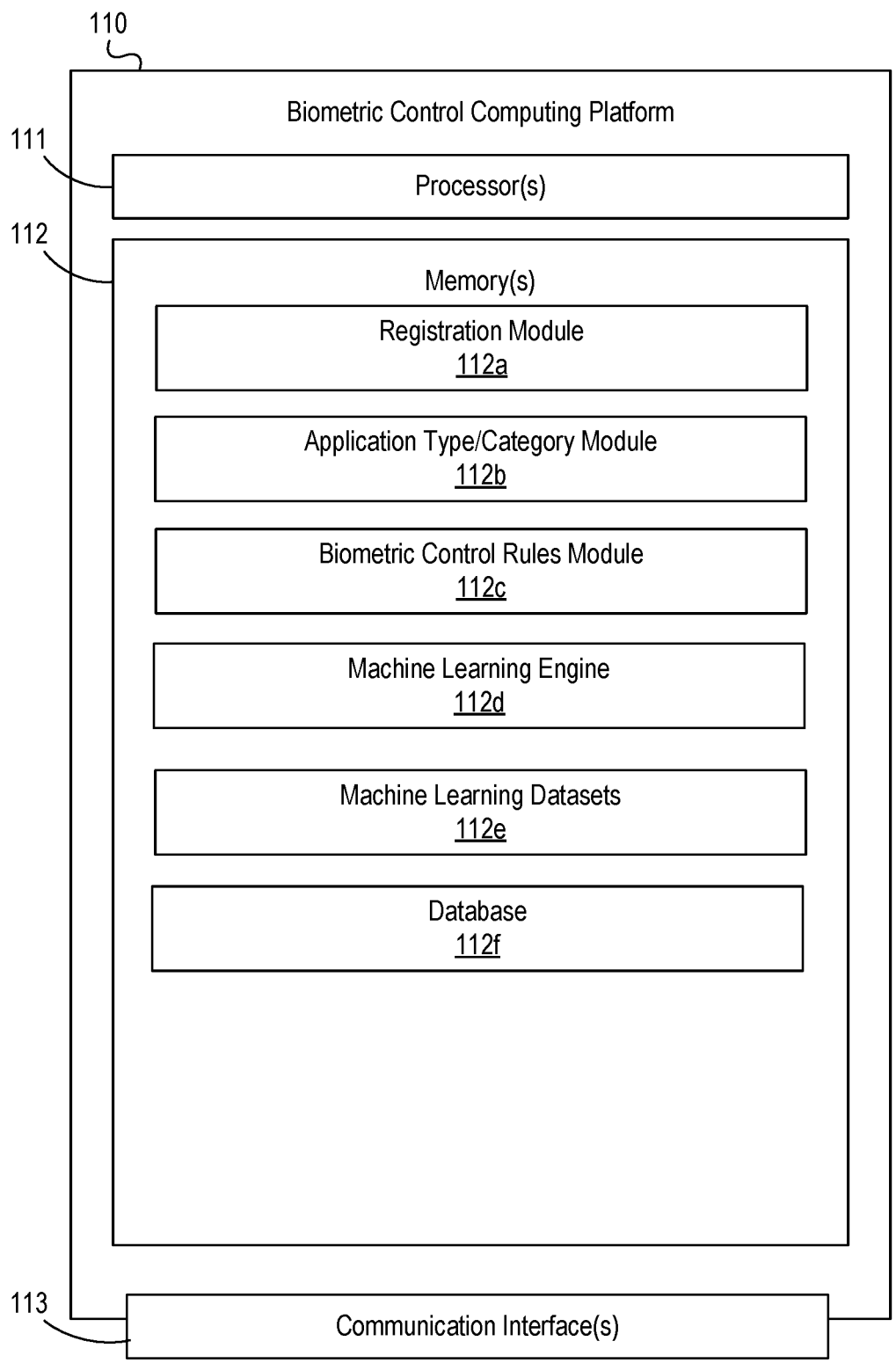

FIGS. 1A-1B depict an illustrative computing environment for implementing and using a system for dynamic enhanced security based on biometric authentication and tracking in accordance with one or more aspects described herein. Referring to FIG. 1A, computing environment 100 may include one or more computing devices and/or other computing systems. For example, computing environment 100 may include biometric control computing platform 110, entity computing system 1 120, entity computing system 2 125, a first local user computing device 150, a second local user computing device 155, a first remote user computing device 170, and a second remote user computing device 175. Although two entity computing systems 120, 125, two local user computing devices 150, 155, and two remote user computing device 170, 175 are shown, more or fewer devices may be used without departing from the invention.

Biometric control computing platform 110 may be configured to provide intelligent, dynamic, enhanced security and protection functions based on, for example, biometric authentication and tracking. For instance, a user may register a device, such as a user computing device (e.g., remote user computing device 170, 175) with the biometric control computing platform 110. Registration may include providing user information, information about applications executing on the user device, biometric data (e.g., fingerprint data or the like), and the like. This data may be stored by, for example, biometric control computing platform 110.

In some examples, user preferences may be requested. For instance, a user may identify one or more applications or types or categories of applications for which enhanced security should be enabled or activated. For instance, a user may select to enable enhanced security for some applications or categories of types of applications and not others. Additionally or alternatively, the biometric control computing platform 110 may identify and to determine one or more applications or types of applications to which to apply enhanced protections. This information may also be stored by the biometric control computing platform 110.

Based on the registration data, any user preferences received, and the like, the biometric control computing platform may generate one or more biometric control instructions or rules. The generated instructions or rules may be transmitted to the user computing device (e.g., remote user computing device 170, remote user computing device 175, or the like) and executed. Accordingly, as a user executes one or more applications on the user device, biometric control rules or instructions may be executed. Additionally or alternatively, one or more rules or instructions may be executed upon being received by the user device.

In some examples, executing one or more rules or instructions may include capturing and analyzing biometric data, such as fingerprint data, as the user interacts with the user computing device. For instance, the user computing device (e.g., remote user computing device 170, remote user computing device 175, or the like) may include a touch screen or touch sensitive display. In some examples, an entire surface of the touch screen or touch sensitive display may include a biometric sensor or scanner that may capture fingerprint data as the user interacts with the user device. Accordingly, the remote user computing device 170, remote user computing device 175, or the like, may continuously (or nearly continuously) evaluate biometric data of the user (e.g., captured as the user interacts with any portion of the touch screen) to authenticate the user and modify functionality or accessibility of an application (e.g., for which enhanced security is enabled) if a non-registered user, or the like, is detected. If a non-registered user is detected, the system may move the application to the background, limit functionality associated with the application, modify an appearance of the application, return a user to a home screen, or the like.

The user device may, even after detecting a non-registered user, continue capturing and evaluating biometric data as the user interacts with the device. Accordingly, upon again detecting the biometric data of the registered user, the application may be further modified to return the application to the foreground, resume a user's session in the application, further modify or remove modifications to an appearance of the application, and the like.

Entity computing system 1 120 and entity computing system 2 125 may be computing devices associated with the entity or enterprise organization implementing the biometric control computing platform 110. One or more of entity computing system 1 120, entity computing system 2 125, or the like, may be or include one or more computing devices, servers, systems, or the like, associated with or internal to the entity implementing the biometric control functionality and may host one or more applications executing on the user device, such as a mobile banking application, online banking application, or the like. Additionally or alternatively, entity computing system 1 120 and/or entity computing system 2 125 may store data associated with a plurality of users, such as account data, contact information data, and the like, that may be accessed by the user via the application executing on the mobile device.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access the biometric control computing platform 110, entity computing system 1 120, entity computing system 2 125, or the like to control parameters associated with the devices or systems, update or execute rules, modify settings and the like.

The remote user computing device 170 and remote user computing device 175 may be used to communicate with, for example, one or more systems, computing platforms, devices, or the like, to execute rules for biometric control, authentication and tracking. As discussed herein, remote user computing device 170, remote user computing device 175, or the like, may be a user computing device, such as a mobile device. For instance, remote user computing device 170 and/or remote user computing device 175 may be a smartphone, wearable device, tablet computer, or the like, having a touch screen or touch sensitive display associated therewith. Remote user computing device 170 may include one or more sensors 172 and remote user computing device 175 may include one or more sensors 177. In some examples, the sensors may include a plurality of different types of sensors (e.g., motion sensors, location sensors, and the like). In addition, the sensors 172 and/or 177 may include biometric sensing devices. In some examples, these biometric sensing devices may detect or capture biometric data (such as fingerprint data), user input data including biometric data, and the like, as the user interacts with remote user computing device 170 and/or remote user computing device 175. In some arrangements, the sensors 172 and/or 177 may detect or capture biometric data from a user input received via any portion or regions of a touch screen display of the remote user computing device 170 and/or remote user computing device 175. For instance, in some examples, an entire touch screen display may be able to capture biometric data. In some arrangements, less than all of the touch screen display may be configured to capture biometric data. For instance, in some examples, at least 99% of the touch screen display may be configured to capture biometric data, at least 95% of the touch screen display may be configured to capture biometric data, at least 90% of the touch screen display may be configured to capture biometric data, at least 80% of the touch screen display may be configured to capture biometric data, at least 50% of the touch screen display may be configured to capture biometric data, or the like. In some examples, the area of the touch screen configured to capture biometric data may be based on a size of the display, type of device, user preferences, or the Computing environment 100 also may include one or more computing platforms. For example, and as noted above, computing environment 100 may include biometric control computing platform 110. As illustrated in greater detail below, biometric control computing platform 110 may include one or more computing devices configured to perform one or more of the functions described herein. For example, biometric control computing platform 110 may include one or more computers (e.g., laptop computers, desktop computers, servers, server blades, or the like).

As mentioned above, computing environment 100 also may include one or more networks, which may interconnect one or more of biometric control computing platform 110, entity computing system 1 120, entity computing system 2 125, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, biometric control computing platform 110, entity computing system 1 120, entity computing system 2 125, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect biometric control computing platform 110, entity computing system 1 120, entity computing system 2 125, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., biometric control computing platform 110, entity computing system 1 120, entity computing system 2 125, local user computing device 150, local user computing device 155) with one or more networks and/or computing devices that are not associated with the organization. For example, remote user computing device 170, remote user computing device 175, might not be associated with an organization that operates private network 190 (e.g., because remote user computing device 170, remote user computing device 175, may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect remote user computing device 170, remote user computing device 175, to private network 190 and/or one or more computing devices connected thereto (e.g., biometric control computing platform 110, entity computing system 1 120, entity computing system 2 125, local user computing device 150, local user computing device 155).

Referring to FIG. 1B, biometric control computing platform 110 may include one or more processors 111, memory 112, and communication interface 113. A data bus may interconnect processor(s) 111, memory 112, and communication interface 113. Communication interface 113 may be a network interface configured to support communication between biometric control computing platform 110 and one or more networks (e.g., private network 190, public network 195, or the like). Memory 112 may include one or more program modules having instructions that when executed by processor(s) 111 cause biometric control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of biometric control computing platform 110 and/or by different computing devices that may form and/or otherwise make up biometric control computing platform 110.

For example, memory 112 may have, store and/or include a registration module 112a. Registration module 112a may store instructions and/or data that may cause or enable the biometric control computing platform 110 to receive data related to one or more users, user devices, and the like. In some examples, registration module 112a may receive other registration data such as user options to enable biometric control (e.g., particular applications to provide enhanced protections, type or category of application, or the like). In some arrangements, authentication data (e.g., biometric data including, for example, one or more fingerprints of a user, device data, username and password data, PIN, or the like) may be provided via the registration module 112a and pre-stored for later comparison to received authentication or other biometric data. The registration module 112a may, upon receiving registration data, modify a database to store the registration data in a new entry. In some examples, registration module 112a may, with permission of the user, retrieve data related to the user and/or user device from one or more other entity devices or systems (e.g., pre-stored account data, authentication data, or the like), such as entity computing system 1 120, entity computing system 2 125, or the like.

Biometric control computing platform 110 may further have, store and/or include application type/category module 112b. For instance, after registering a user device, application data associated with one or more applications executing on the user device may be received by the biometric control computing platform 110 and analyzed to identify one or more applications for enhanced security based on biometric authentication and tracking. For instance, each application may be evaluated to identify a type of application or category associated therewith. In some examples, the evaluation may be binary (e.g., type or category having enhanced security vs. type of category not having enhanced security). Accordingly, each application may be categorized into one of the two options.

Additionally or alternatively, each application may be fitted into 3 or more categories or types. In some examples, applications in a first category may have full enhanced security, applications in a second category may have some enhanced security (e.g., fewer than full protection provided to the first category of applications), and applications in a third category may have no enhanced security (e.g., basic device and/or application authentication). Although two and three categories are provided as examples, more categories or types may be used without departing from the invention.

Biometric control computing platform 110 may further have, store and/or include biometric control rules module 112c. Biometric control rules module 112c may store instructions and/or data that may cause or enable the biometric control computing platform 110 to generate one or more rules for executing or enabling enhanced security, capturing biometric data, analyzing biometric data, modifying functionality of accessibility of one or more applications, and the like. In some examples, the rules may be generated based on user preferences (e.g., received during a registration process) and/or based on categories or types of applications determined or identified by the application type/category module 112b. In some examples, the rules may be transmitted to a user device (e.g., remote user computing device 170, remote user computing device 175, or the like) and executed. In some arrangements, one or more rules may be executed upon detecting that an application has launched or is currently executing. In some examples, one or more rules may be executed upon transfer to the user device.

In some examples, machine learning may be used to recognize patterns in user input, biometric data, identify rules for execution, identify modifications to functionality or accessibility of an application, and the like. Accordingly, biometric control computing platform 110 may further have, store and/or include a machine learning engine 112d and machine learning datasets 112e. Machine learning engine 112d and machine learning datasets 112e may store instructions and/or data that cause or enable biometric control computing platform 110 to analyze biometric data, user input patterns, and the like, to generate one or more machine learning datasets to identify modifications to functionality or accessibility of an application, identify one or more rules for execution, identify one or more applications or types of applications for which to apply enhanced security, and the like. The machine learning datasets 112e may be generated based on analyzed data (e.g., data from previously received data, and the like), raw data, and/or received from one or more outside sources.

The machine learning engine 112d may receive data and, using one or more machine learning algorithms, may generate one or more machine learning datasets 112e. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112d may analyze data to identify patterns of activity, sequences of activity, and the like, to generate one or more machine learning datasets 112e. The machine learning datasets 112e may be updated and/or validated based on subsequent data received.

Biometric control computing platform 110 may further have, store and/or include one or more databases 112f. Database 112f may store data related to user applications, user and/or account information, user preferences, and the like.

FIGS. 2A-2F depict one example illustrative event sequence for implementing and using enhanced security functions based in biometric authentication and tracking in accordance with one or more aspects described herein. The events shown in the illustrative event sequence are merely one example sequence and additional events may be added, or events may be omitted, without departing from the invention.

At step 201, a request to register may be received by a user device, such as remote user computing device 170. For instance, user input requesting registration of the user, device, or the like, may be received by the remote user computing device 170 (e.g., via keypad, touch screen, or the like). In some examples, the request to register may include registration data. For instance, user information such as name, contact information, account information, and the like, may be provided. Additionally or alternatively, user device data may be received. For instance, a unique identifier associated with remote user computing device 170, phone number associated with remote user computing device 170, or the like, may be received. In some examples, the registration data may further include biometric data, such as fingerprint, voiceprint, iris scan, and the like. As discussed herein, this data may be used to verify that a user is a registered user (e.g., authenticate a user to the device) and/or verify that a user interacting with remote user computing device 170 is a registered user.

At step 202, a connection may be established between the remote user computing device 170 and the biometric control computing platform 110. For instance, a first wireless connection may be established between the biometric control computing platform 110 and remote user computing device 170. Upon establishing the first wireless connection, a communication session may be initiated between biometric control computing platform 110 and remote user computing device 170.

At step 203, the request to register and registration data may be transmitted from the remote user computing device 170 to the biometric control computing platform 110. For instance, the request to register and registration data may be transmitted during the communication session initiated upon establishing the first wireless connection.

At step 204, the request to register and registration data may be received by the biometric control computing platform 110. At step 205, responsive to receiving the request to register and registration data, a registration entry may be generated. For instance, a database may be modified to include an entry associated with the registration request. The entry may include a plurality of data elements associated with the user, remote user computing device 170, biometric data, and the like. In some examples, the database entry may include account or other data associated with the user and retrieved from one or more entity systems, such as entity computing system 1 120.

Figure 2A:
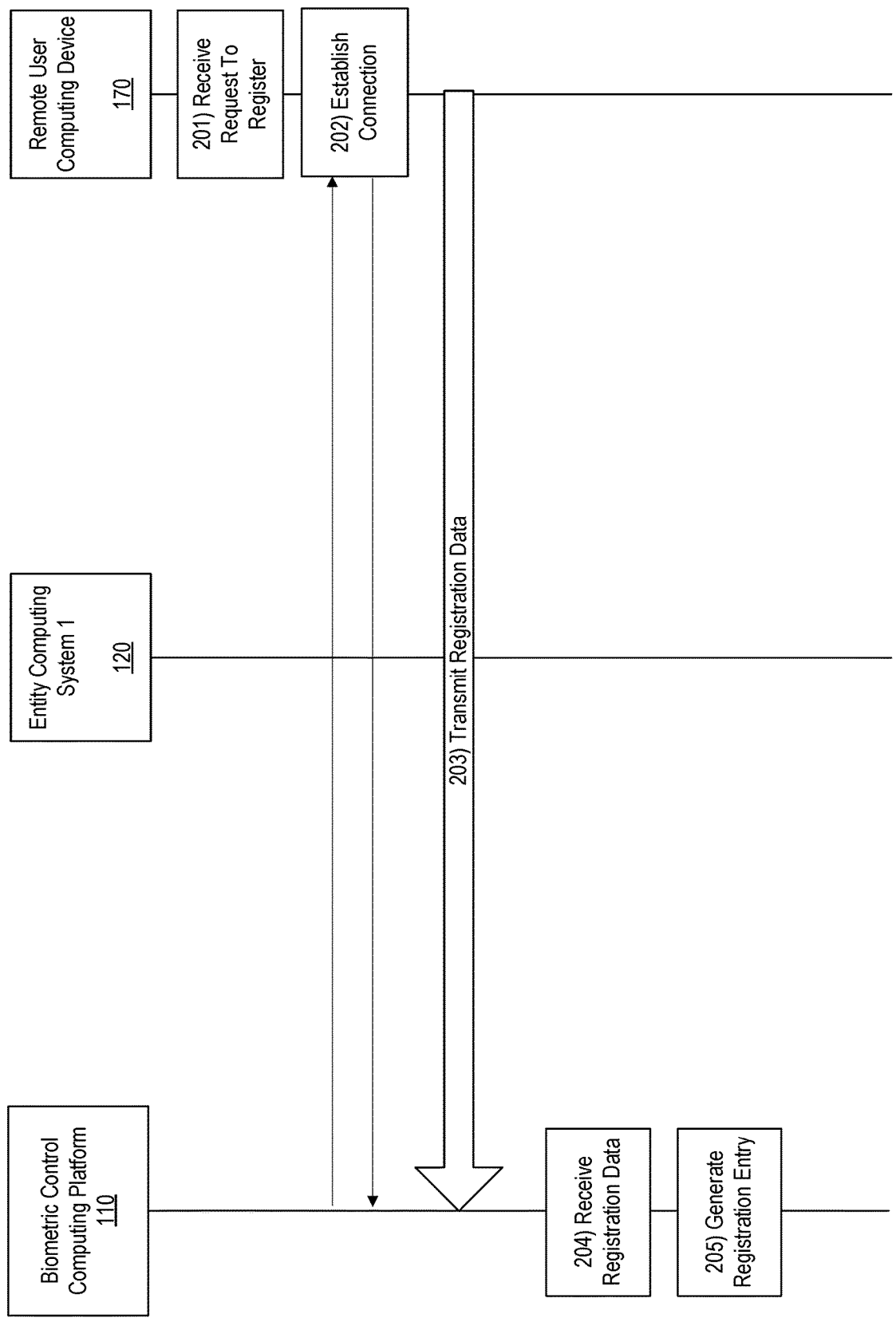
Figure 2B:
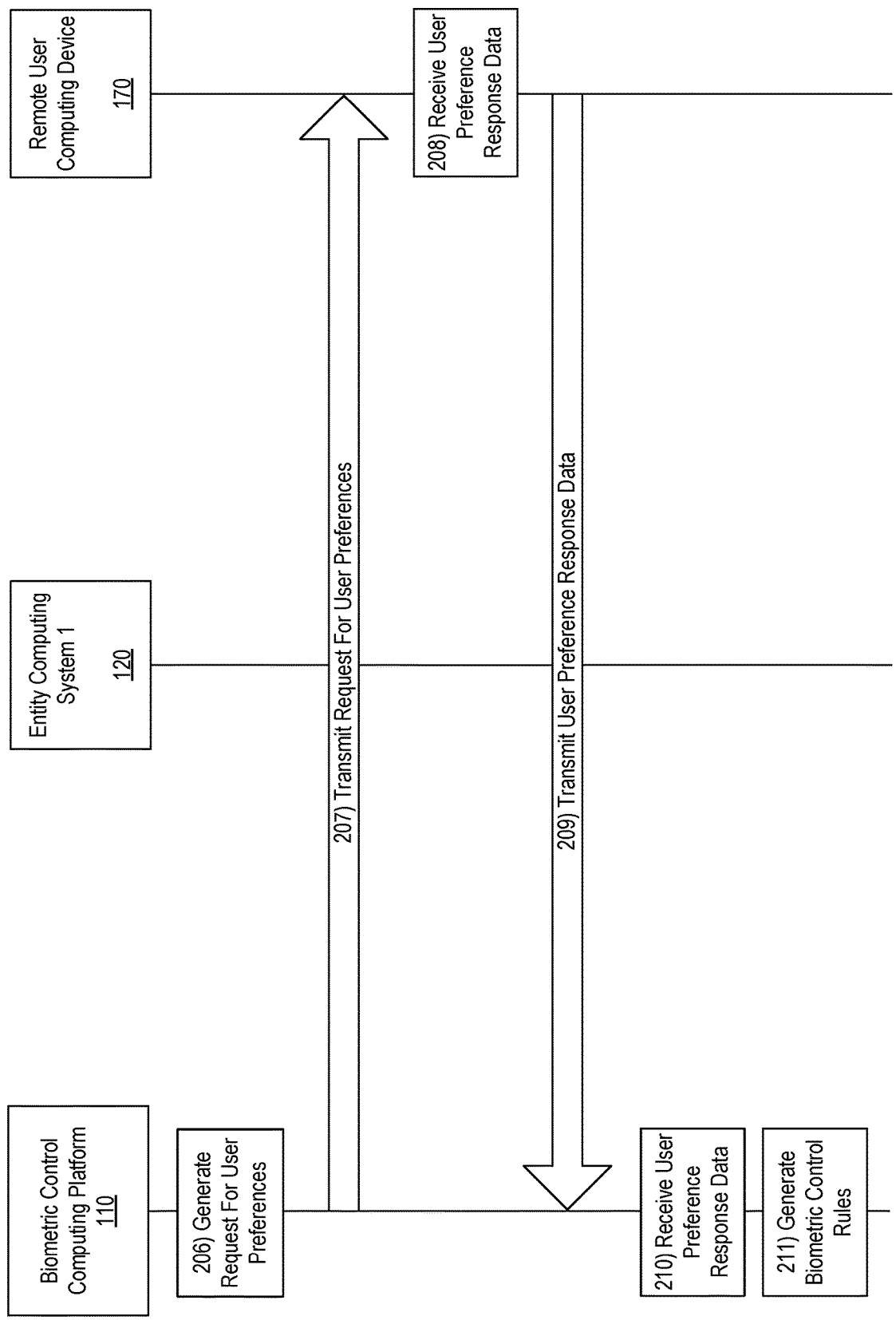

With reference to FIG. 2B, at step 206, a request for user preferences may be generated by the biometric control computing platform 110. For instance, a request for user preferences related to when to activate enhanced security, types or categories or names of applications to which to apply enhanced security, and the like, may be generated.

At step 207, the request for user preferences may be transmitted from the biometric control computing platform 110 to the remote user computing device 170. For instance, the request for user preferences may be transmitted during the communication session initiated upon establishing the first wireless connection. Alternatively, another wireless connection may be established and communication session initiated.

At step 208, the request may be received and user preference response data may be received by the remote user computing device 170. For instance, a response to the request for user preferences may be received by the remote user computing device 170 and user preference response data may be generated based on the user input.

At step 209, the user preference response data may be transmitted from the remote user computing device 170 to the biometric control computing platform 110. For instance, the user preference response data may be transmitted during the communication session initiated upon establishing the first wireless connection. Alternatively, another wireless connection may be established and communication session initiated.

At step 210, the user preference response data may be received by the biometric control computing platform 110. At step 211, based on the received user preferences and/or other enhanced security parameters or criteria (e.g., biometric control criteria identified and/or generated by the biometric control computing platform 110) and the like, one or more biometric control rules may be generated. In some examples, machine learning may be used to generate the one or more biometric control rules. Biometric control rules may include rules controlling when enhanced security via biometric authentication and tracking is activated or enabled (e.g., a user may select to activate when connected to public WiFi but not when connected to home WiFi), applications for which enhanced security should be activated, types or categories of applications for which enhanced security should be activated, and the like.

In some examples, the user preference data may include data associated with applications executing on, downloaded to, or otherwise maintained on the remote user computing device 170. In some arrangements, generating the one or more biometric control rules may include identifying a type of application or category associated with each application on the remote user computing device 170 and storing that information for use in generating rules to activate enhanced protection.

Figure 2C:
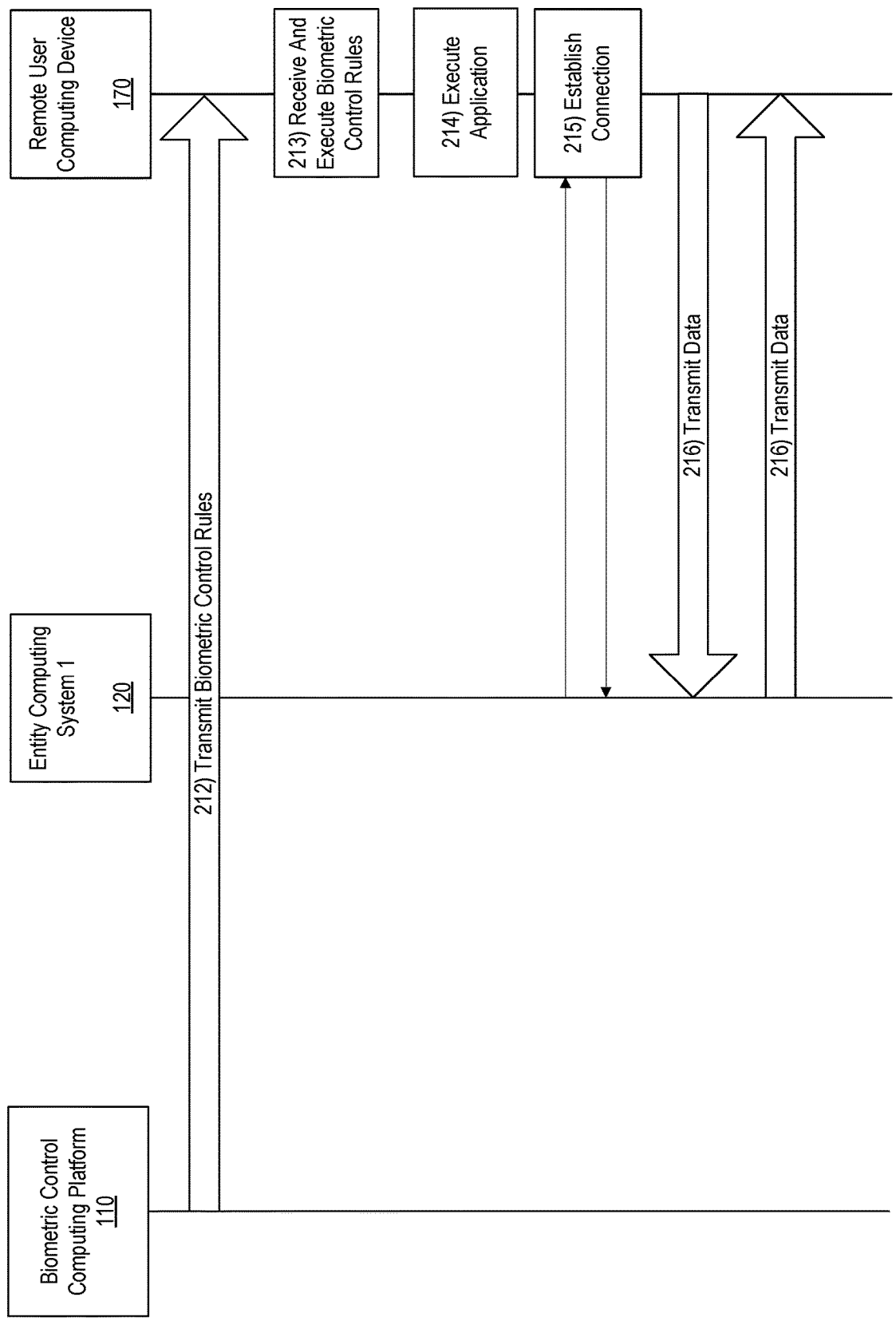

With reference to FIG. 2C, at step 212, the biometric control rules may be transmitted from the biometric control computing platform 110 to the remote user computing device 170. In some examples, the biometric control rules may be transmitted during the communication session initiated upon establishing the first wireless connection. In other examples, if a new wireless connection may be established and communication session initiated.

At step 213, the biometric control rules may be received by the remote user computing device 170 and executed by the remote user computing device 170. In some examples, one or more rules may be executed upon being received by the remote user computing device 170. Additionally or alternatively, one or more rules may be stored by the remote user computing device 170 and executed upon detection of a triggering event (e.g., execution or launch of an application, or the like).

At step 214, an application may be executed or launched by the remote user computing device 170. For instance, an application downloaded or otherwise provided to the remote user computing device 170 may be executed. In some examples, executing the application may include authenticating a user, such as by requesting authentication data including username and password, biometric data, person identification number, one-time passcode, or the like.

At step 215, a connection may be established between the remote user computing device 170 and entity computing system 1 120. For instance, a second wireless connection may be established between the remote user computing device 170 and entity computing system 1 120. Upon establishing the second wireless connection, a communication session may be initiated between entity computing system 1 120 and remote user computing device 170.

At step 216, data may be transmitted between the remote user computing device 170 and the entity computing system 1 120. For instance, data associated with user accounts, and the like, may be transmitted and/or received by the remote user computing device and entity computing system 1 120 during the communication session initiated upon establishing the second wireless connection.

Figure 2D:
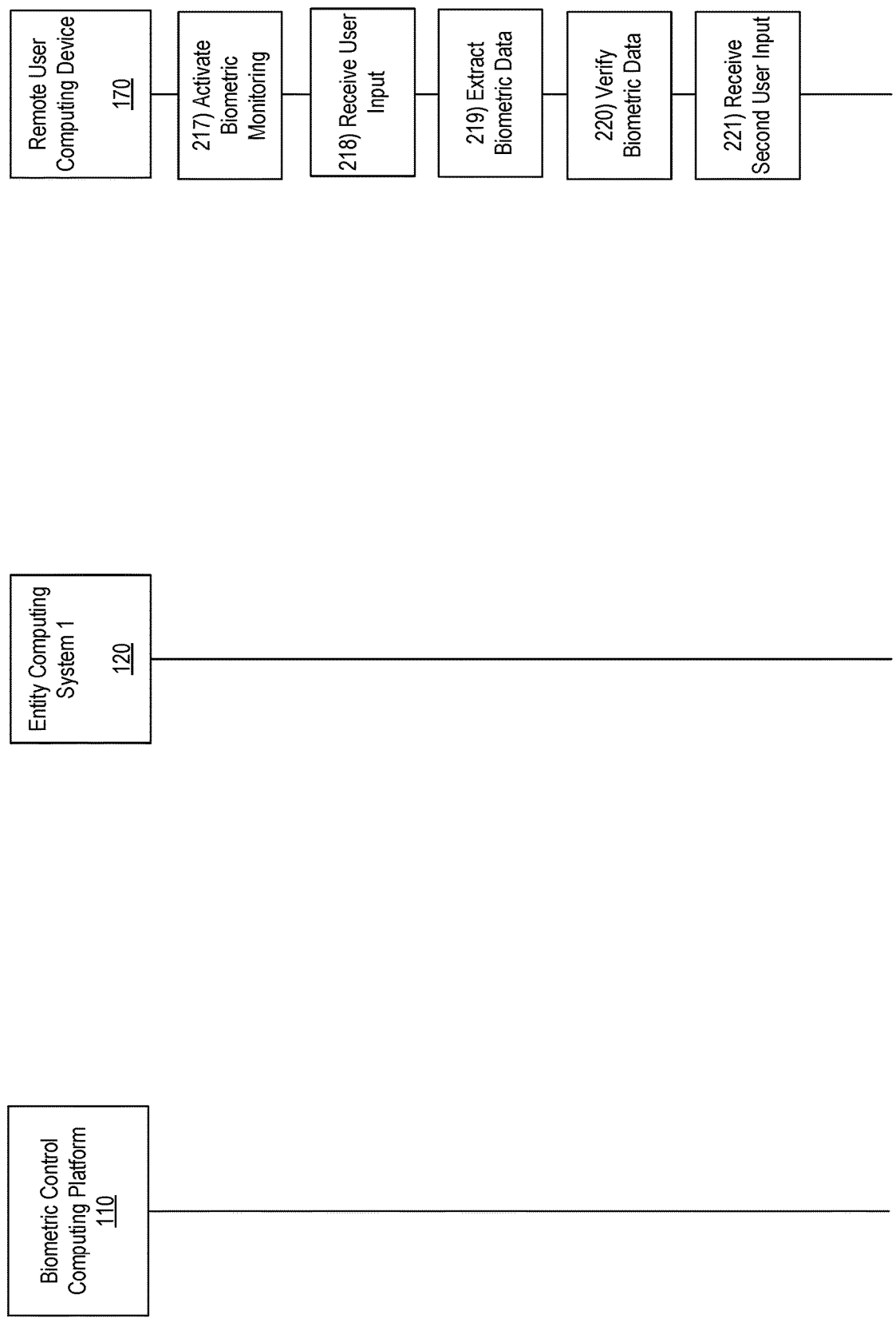

With reference to FIG. 2D, the application that executed may be evaluated to determine whether enhanced security applies. If so, at step 217, enhanced security including biometric monitoring may be activated and/or one or more biometric control rules may be executed. For instance, if the application or type of application that was executed is flagged for enhanced security, one or more protections, instructions, or rules (e.g., full screen fingerprint monitoring, or the like) may be executed. Executing a rule or instruction, such as full screen fingerprint monitoring may include activating a biometric sensor capturing biometric data from an entire touch display screen, at least a certain portion of the touch display screen (e.g., at least 95%, at least 905, or the like), or the like. Accordingly, as a user interacts with the application via the touch screen display of the remote user computing device 170, fingerprint data may be captured (in some examples, continuously) to ensure the user is a registered user.

In some examples, the enhanced security may be activated for only the application that executed (e.g., at step 214). Additionally or alternatively, enhanced security may be activated for other applications (e.g., all or some applications also executing on the device 170, or the like).

At step 218, user input may be received via the touch screen display of remote user computing device 170. For instance, a user may interact with the application launched at step 214 via the touch screen display of remote user computing device 170. As the user interacts with the application, user input may be received and, at step 219, biometric data may be extracted from the received user input. For instance, as the user touches the screen, fingerprint or other biometric data may be captured and extracted from the captured data.

At step 220, the extracted biometric data may be verified to confirm that the user interacting with the application is a registered user. For instance, the extracted biometric data may be compared to pre-stored biometric data provided via the remote user computing device 170 during, for example, a registration process. The pre-stored data may be stored, in at least some examples, at both the remote user computing device 170 and the biometric control computing platform 110.

In some examples, the extracted biometric data may be continuously compared to pre-stored biometric data. Additionally or alternatively, user input may be captured and biometric data extracted for evaluation at predetermined time intervals (e.g., every 2 seconds, every 3 seconds, every 10 seconds, or the like). In some examples, the interval at which data is captured and validated may be selected by a user (e.g., customized by the user). Additionally or alternatively, the biometric control computing platform 110 may determine the time interval. In some arrangements, the interval at which data is captured may be part of a rule or instruction generated by the biometric control computing platform 110 and executed by the remote user computing device 170.

At step 221, second user input may be received. For instance, after receiving and evaluating the first user input (e.g., confirming that the user is a registered user), second or additional user input may be received. Similar to the user input received at step 218, the second user input may be user input provided via the touch screen display (e.g., any area or portion of the display) of the remote user computing device 170 as the user interacts with the application executed at step 214. In some examples, the second user input may be captured as the user is verified as a registered user (e.g., continuous analysis and verification). Additionally or alternatively, the second user input may be received and data captured at a predetermined time interval.

With reference to FIG. 2E, at step 222, second biometric data may be extracted from the received second user input. For instance, as the user touches the screen, fingerprint or other biometric data may be captured and extracted from the captured second user input data.

The extracted second biometric data may be evaluated to determine whether the biometric data matches pre-stored data of a registered user. As an example, at step 223, a non-registered user may be detected. For instance, the extracted biometric data from the second user input might not match the pre-stored biometric data of a registered user. In some examples, a match may be based on at least a threshold percentage or number of points of the biometric data (e.g., points of a fingerprint) matching the pre-stored data. For instance, if at least 50%, 75%, 90% or the like, of the points of biometric data match, the user may be recognized as a registered user. If less than the threshold number or percentage of points matches, the system may detect the user as a non-registered user.

At step 224, in response to detecting a non-registered user, the system may modify accessibility and/or functionality of the application with which the user was interacting. For instance, in response to detecting biometric data (e.g., fingerprint) of a non-registered user, the remote user computing device 170 may execute an instruction to move the application with which the user was interacting (e.g., the application launch in step 214 for which enhanced security is enabled) from a foreground to a background, such that the user cannot access the application. In some examples, the application may continue to run in the background and/or the user's session may be maintained (e.g., until a predetermined time out period has expired). Additionally or alternatively, modifying accessibility and/or functionality of the application may include limiting types of functions or processes available to a user (e.g., some functions may be available to the non-registered user while others are not). Various other modifications to functionality and/or accessibility may be executed without departing from the invention.

At step 225, third user input may be received. For instance, after receiving and evaluating the second user input (e.g., detecting that the user is a not a registered user), third or additional user input may be received. Similar to the user input received at step 218, the third user input may be user input provided via the touch screen display of the remote user computing device 170 as the user interacts with the application executed at step 214. In some examples, the third user input may be captured continuously and/or at predetermined time intervals.

At step 226, third biometric data may be extracted from the received third user input. For instance, as the user touches the screen, fingerprint or other biometric data may be captured and extracted from the captured third user input data.

Figure 2F:
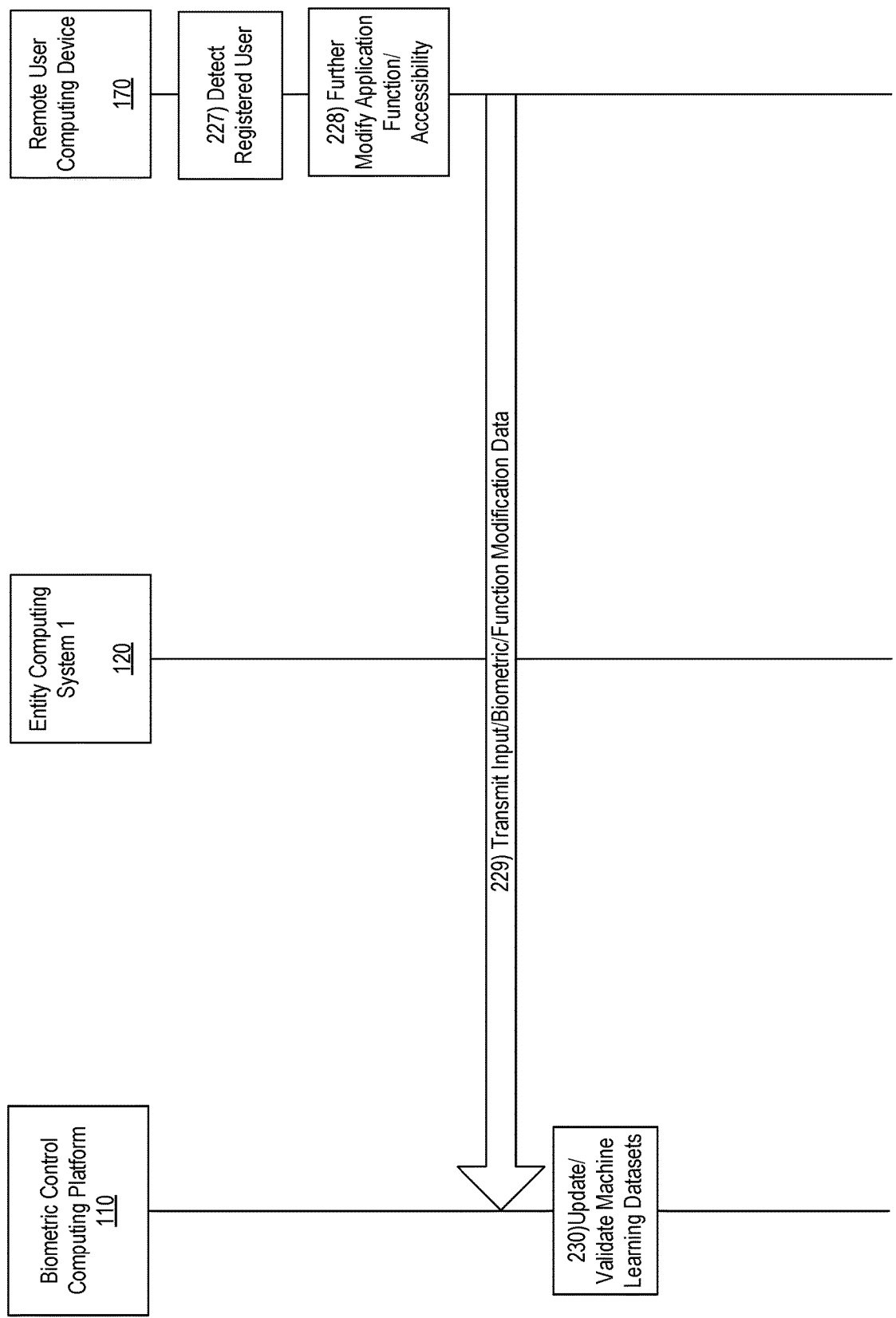

With reference to FIG. 2F, at step 227, the extracted third biometric data may be compared to pre-stored data to determine whether the user is a registered user. At step 227, the system may determine that the extracted third biometric data matches (e.g., within a predetermined threshold) the pre-stored data and, accordingly, the user may be identified as a registered user.

At step 228, the application that was previously modified in response to detecting the non-registered user may be further modified upon detecting the registered user. For instance, an instruction may be executed causing the application to move from the background to the foreground. In some examples, additional authentication data may be requested from the user to resume use of the application. Additionally or alternatively, functionality of the application may be further modified to again provide full functionality (e.g., enable functions disabled in response to detecting a non-registered user). Various other modifications may be used without departing from the invention.

At step 229, the captured biometric data, any function or access modification data, and the like, may be transmitted from the remote user computing device 170 to the biometric control computing platform. The data may be transmitted during a previously established communication session or a new communication session may be established via a wireless connection.

At step 230, the transmitted data may be received by the biometric control computing platform 110 and may be used to update and/or validate one or more machine learning datasets.

Figure 3A:
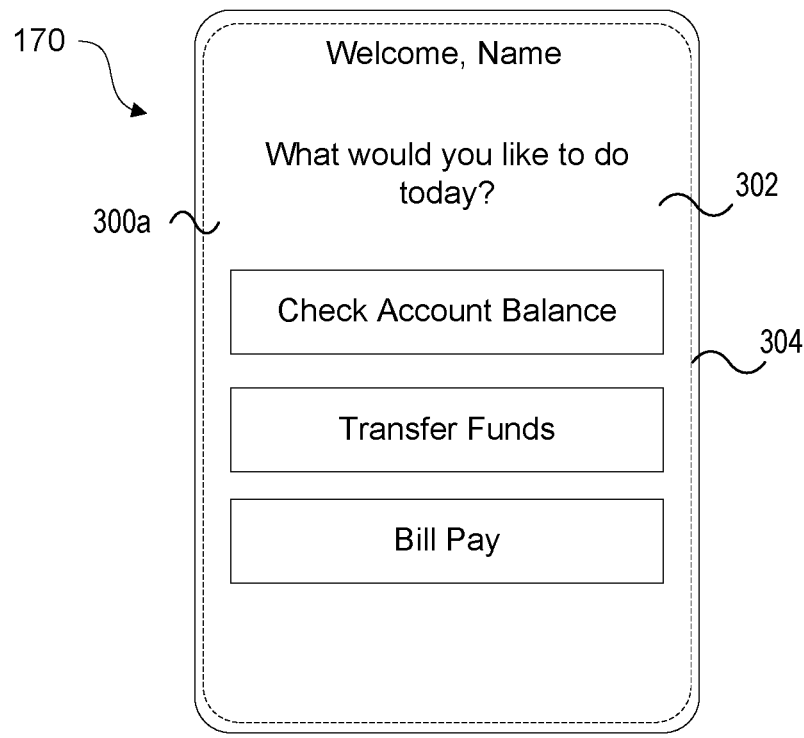
FIGS. 3A and 3B illustrate an example user device displaying user interfaces in accordance with one or more aspects described herein.
Figure 3B:
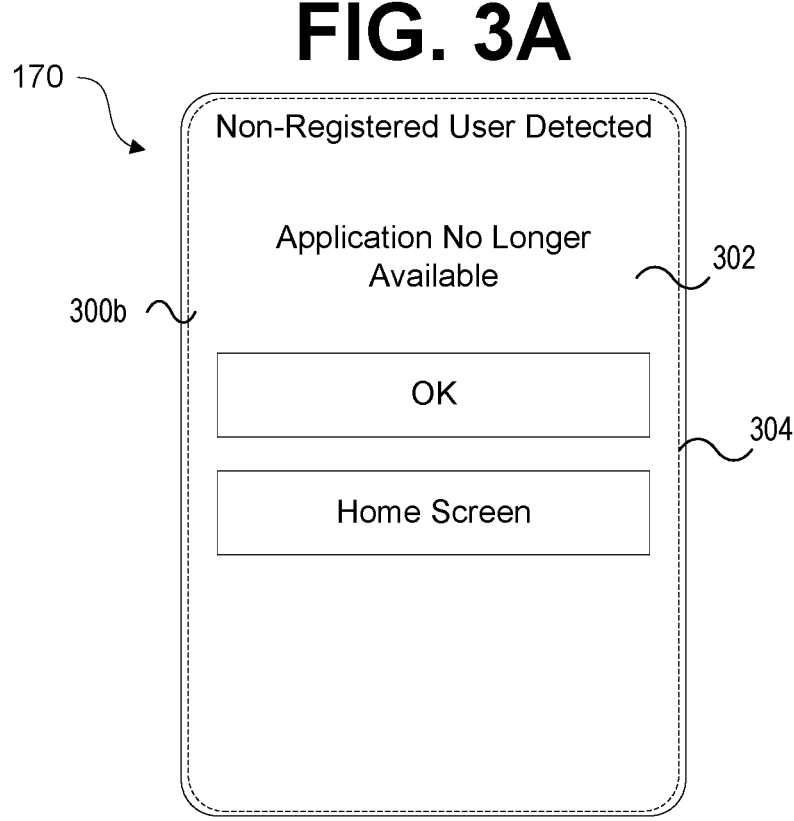

FIG. 3A illustrates one example device 170 depicting a user interface 300a offering functionality associated with an application executing on the remote user computing device 170. In some examples, the application may have enhanced security and biometric monitoring enabled. Accordingly, as the user interacts with the touch screen display 302 (e.g., any portion or region) of the remote user computing device 170, a biometric sensing region 304 may capture user input provided at any part of the touch screen display 302. The biometric sensing region 304 is shown schematically in FIGS. 3A and 3B and may cover or detect biometric data on an entirety of the touch screen display, or a portion of the touch screen less than the entirety (e.g., at least 99% of the touch screen display, at least 95% of the touch screen display, at least 90% of the touch screen display, and the like). The boundary shown in FIGS. 3A and 3B is merely one example other sizes or configurations may be used without departing from the invention. As discussed herein, the biometric data captured may be compared to pre-stored data continuously and/or at predetermined time intervals to verify that a user is a registered user as the user interacts with the application.

FIG. 3B illustrates the example device 170 depicting a user interface 300b showing modified functionality or accessibility after detecting a non-registered user. As discussed herein, as the user interacts with touch screen display 302, biometric data may be captured (e.g., via biometric sensing region 304) and compared to pre-stored data. If the biometric data does not match pre-stored data, remote user computing device 170 may execute an instruction moving the application to the background of the device. Additionally or alternatively, the remote user computing device 170 may cause display of user interface 300b which may provide alternatives such as returning to a home screen or acknowledging that the application accessibility has been modified. As discussed herein, once a registered user is again detected, the application may return to the foreground and display interface 300a or other application interface.

FIG. 4 is a flow chart illustrating one example method of implementing enhanced security and biometric monitoring functions according to one or more aspects described herein. The processes illustrated in FIG. 4 are merely some example processes and functions. The steps shown may be performed in the order shown, in a different order, more steps may be added, or one or more steps may be omitted, without departing from the invention. In some examples, one or more steps may be performed simultaneously with other steps shown and described.

At step 400, registration data may be received from a user. For instance, a user may request to register for enhanced security and biometric monitoring and control and may provide registration information such as name, contact information, account information, user device information, biometric data, such as fingerprint, voiceprint, iris scan, or the like, and the like.

At step 402, one or more user preferences may be received. For instance, user preferences related to applications for which enhanced security and biometric monitoring should be activated, thresholds for matching biometric data, requirements for validation, and the like, may be received.

At step 404, one or more biometric control rules or instructions may be received. For instance, biometric control rules related to applications for which enhanced security and biometric data will be enabled, criteria for enabling enhanced security and biometric monitoring, thresholds for matching biometric data, and the like, may be generated by, for instance, biometric control computing platform 110 and transmitted to remote user computing device 170. In some examples, the rules and/or instructions may be generated based on user preference data, user registration data, machine learning datasets, and the like.

At step 406, an application on the remote user computing device 170 may be executed. For instance, a user may launch an application. In response, the remote user computing device 170 may determine (e.g., based on biometric control rules) whether enhanced security and biometric monitoring is or should be enabled for that application. If so, one or more biometric control rules or instructions may be executed.

The remaining steps described with respect to FIG. 4 apply to situations in which the application launched has enhanced security and biometric monitoring enabled.

At step 408, user input may be received. For instance, a user may interact with the application via a touch screen display of remote user computing device 170. As the user interacts with the application, user input data may be captured.

At step 410, biometric data may be extracted from the user input data captured at step 408 and may be compared to pre-stored biometric data (e.g., data received during a registration process). Additionally or alternatively, the captured biometric data may be compared to earlier identified biometric data (e.g., within a predetermined time, during a request to launch an application, during a user session, or the like) to determine whether a change in user has occurred.

At step 412, a determination may be made as to whether the extracted biometric data matches (e.g., within a predetermined threshold) the pre-stored biometric data and/or whether the biometric data is the same as previously captured biometric data, thereby indicating a registered user. If so, the process may return to step 408 and capture additional or subsequent user input, extract and analyze biometric data, and the like.

If, at step 412, the extracted biometric data does not match the pre-stored biometric data and/or a change of biometric data is detected, at step 414 functionality and/or accessibility of the application executed at step 406 may be modified. For instance, as discussed herein, the application may be moved to a background to prevent the non-registered user from accessing the application. Additionally or alternatively, functionality of the application may be limited (e.g., one or more functions may be disabled) in response to detecting a non-registered user.

At step 416, additional user input may be received by the remote user computing device 170. For instance, as a user further interacts with the remote user computing device 170, additional user input data may be captured.

At step 418, additional biometric data may be extracted from the captured additional user input data and analyzed to determine whether it matches pre-stored data of a registered user.

At step 420, a determination may be made as to whether the extracted additional biometric data matches the pre-stored biometric data of a registered user. If not, the system may return to step 416 to capture additional user input, extract and analyze further biometric data, and the like.

If, at step 420, the additional biometric data does match the pre-stored biometric data of a registered user, at step 422, functionality and/or accessibility of the application may be further modified. For instance, the application may be returned to the foreground and made accessible to the registered user. Additionally or alternatively, full functionality may be restored and/or one or more disabled functions may be enabled or re-enabled.

At step 424, a determination may be made as to whether additional user input is being received (e.g., whether the user is continuing to interact with the application via the touch screen of the remote user computing device 170). If so, the process may return to step 408 to receive user input, extract and analyze biometric data, and the like. If not, the process may end.

As discussed, aspects described herein are related to using biometric authentication and controls to aid in maintaining user data privacy and security. As described, user input including biometric data may be captured as a user interacts with an application having enhanced security enabled or activated. Accordingly, as the user touches any portion of the touch screen display of the user device, biometric data may be captured and compared to pre-stored biometric data to confirm that the user is a registered user. If the user is not a registered user, access to the application and/or functionality of the application may be modified.

As discussed herein, these arrangements may provide continuous, real-time verification of a user as the user interacts with the device and/or application. Additionally or alternatively, data may be captured at various time intervals and analyzed to verify the user is a registered user.

The arrangements discussed herein provide for biometric (e.g., fingerprint) data capture and analysis based on user contact or interaction with any portion of the touch screen display. For instance, a biometric sensing region of the user device may correspond to an entire touch screen display, or a portion of the touch screen display. For instance, the biometric sensing region may correspond to 99% of the touch screen display of the device, at least 95% of the touch screen display, at least 90% of the touch screen display, or the like.

Further, as discussed herein, applications may be identified either by the biometric control computing platform or the user for enhanced security. For instance, high-risk applications, such as those dealing with financial transactions (e.g., mobile banking application, online banking application, or the like), personal information, or the like, may be identified as high-risk and/or may be flagged for enhanced security functions.

The arrangements discussed herein may aid in protecting user data and privacy. For instance, a user may launch or execute an application and, in at least some examples, may authenticate to the application. In conventional systems, after the initial authentication, no further authentication or verification is performed as the user interacts with the application (e.g., during the session). However, arrangements discussed herein provide for user input to be captured after initial authentication and, in at least some examples, for an entire duration of time that the user is interacting with the application. Accordingly, as the user interacts with the application or touch screen display, the system may verify, in real-time or near real-time, that the user is a registered user. Accordingly, if a user device should be accessed by a non-registered user after the initial authentication (e.g., the user puts down his or her device and a non-registered user picks it up), the system would detect the non-registered user and modify access to the application. In some example, if a child of a registered user accesses the user's device, the system would permit access to applications not having enhanced security but would modify access and/or functionality of applications having enhanced security.

In some examples, a user may provide biometric data during a registration process. For instance, a user may provide his or her fingerprint during registration. In some examples, a user may provide a fingerprint from every finger, at least a minimum number of fingers, or the like.

Although aspects described herein are directed to comparing captured biometric data to pre-stored data, various aspects may be used to simply detect a change in fingerprint or other biometric data. For instance, if a user authenticates to an application, as the user interacts with the application, any detected change in fingerprint may cause functionality and/or accessibility to be modified.

In some examples, enhanced security may be muted thereby enabling a registered user to permit a non-registered user to interact with the application. For instance, a user may select an option to mute or pause enhanced security to enable use of the device and/or interaction with the application by a non-registered user (e.g., a child or other friend or family member, a passenger in a vehicle that the registered user is driving, or the like).

In some examples, the registered user may be prompted to mute or unmute the enhanced security features. In some arrangements, anytime the registered user's fingerprint or biometric data is detected would unmute any muted enhanced security, return the application to the foreground, or the like.

Although aspects discussed herein are directed to modifying functionality and/or accessibility upon detecting a non-registered user and further modifying functionality and/or accessibility upon further or subsequently detecting a registered user, in some examples, additional authenticating information (e.g., password, personal identification number, biometric data, or the like) may be requested before further modifying functionality and/or accessibility in order to again provide full access to the registered user.

Accordingly, arrangements discussed herein are directed to providing additional and/or enhanced security in real-time to provide an additional layer of protection for user data as a user interacts with his or her mobile device.

Figure 5:
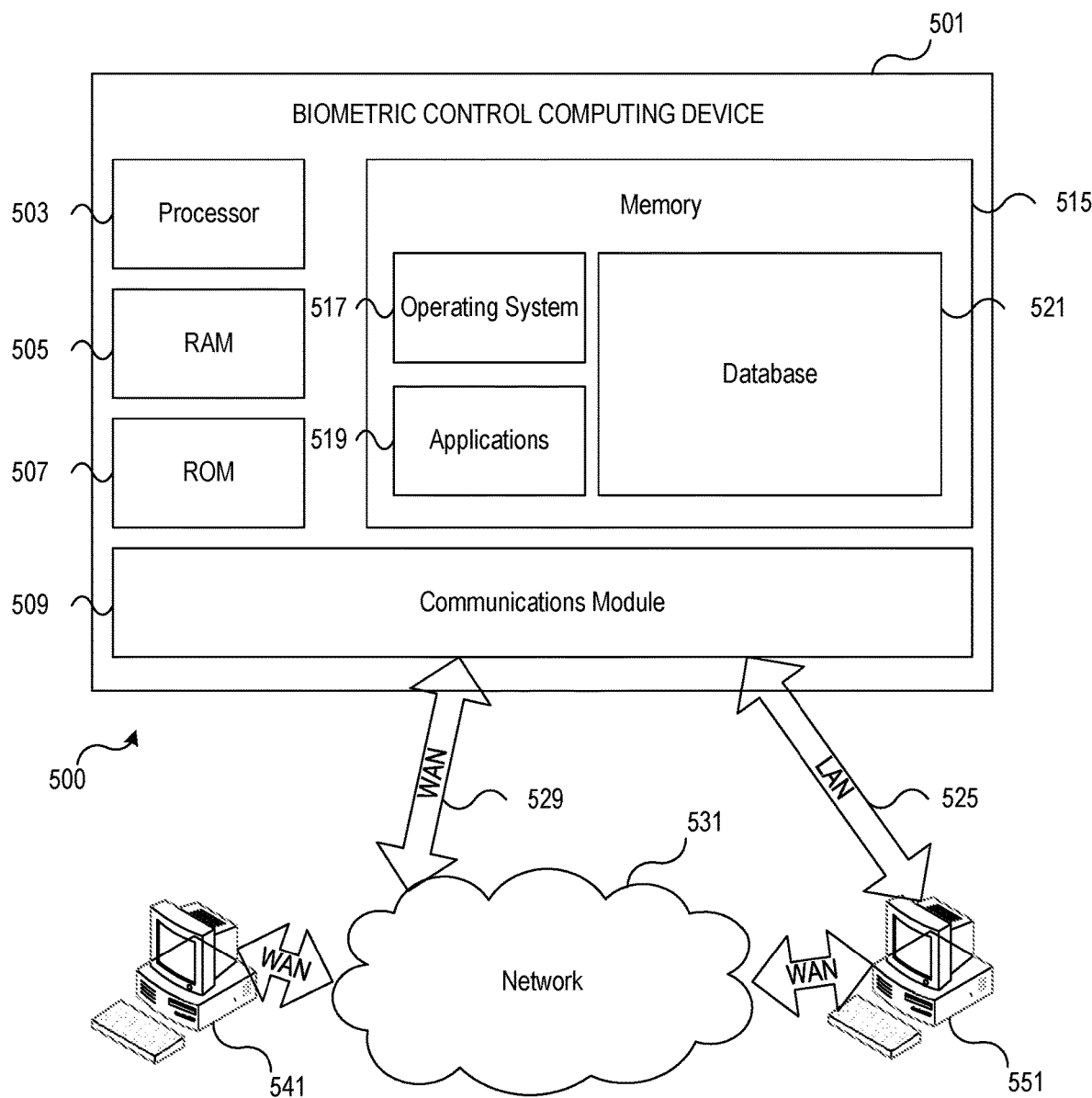
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include biometric control computing device 501 having processor 503 for controlling overall operation of biometric control computing device 501 and its associated components, including Random Access Memory (RAM) 505, Read-Only Memory (ROM) 507, communications module 509, and memory 515. Biometric control computing device 501 may include a variety of computer readable media. Computer readable media may be any available media that may be accessed by biometric control computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by biometric control computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on biometric control computing device 501. Such a processor may execute computer-executable instructions stored on a computer-readable medium.

Software may be stored within memory 515 and/or storage to provide instructions to processor 503 for enabling biometric control computing device 501 to perform various functions as discussed herein. For example, memory 515 may store software used by biometric control computing device 501, such as operating system 517, application programs 519, and associated database 521. Also, some or all of the computer executable instructions for biometric control computing device 501 may be embodied in hardware or firmware. Although not shown, RAM 505 may include one or more applications representing the application data stored in RAM 505 while biometric control computing device 501 is on and corresponding software applications (e.g., software tasks) are running on biometric control computing device 501.

Communications module 509 may include a microphone, keypad, touch screen, and/or stylus through which a user of biometric control computing device 501 may provide input, and may also include one or more of a speaker for providing audio output and a video display device for providing textual, audiovisual and/or graphical output. Computing system environment 500 may also include optical scanners (not shown).

Biometric control computing device 501 may operate in a networked environment supporting connections to one or more remote computing devices, such as computing devices 541 and 551. Computing devices 541 and 551 may be personal computing devices or servers that include any or all of the elements described above relative to biometric control computing device 501.

The network connections depicted in FIG. 5 may include Local Area Network (LAN) 525 and Wide Area Network (WAN) 529, as well as other networks. When used in a LAN networking environment, biometric control computing device 501 may be connected to LAN 525 through a network interface or adapter in communications module 509. When used in a WAN networking environment, biometric control computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 6:
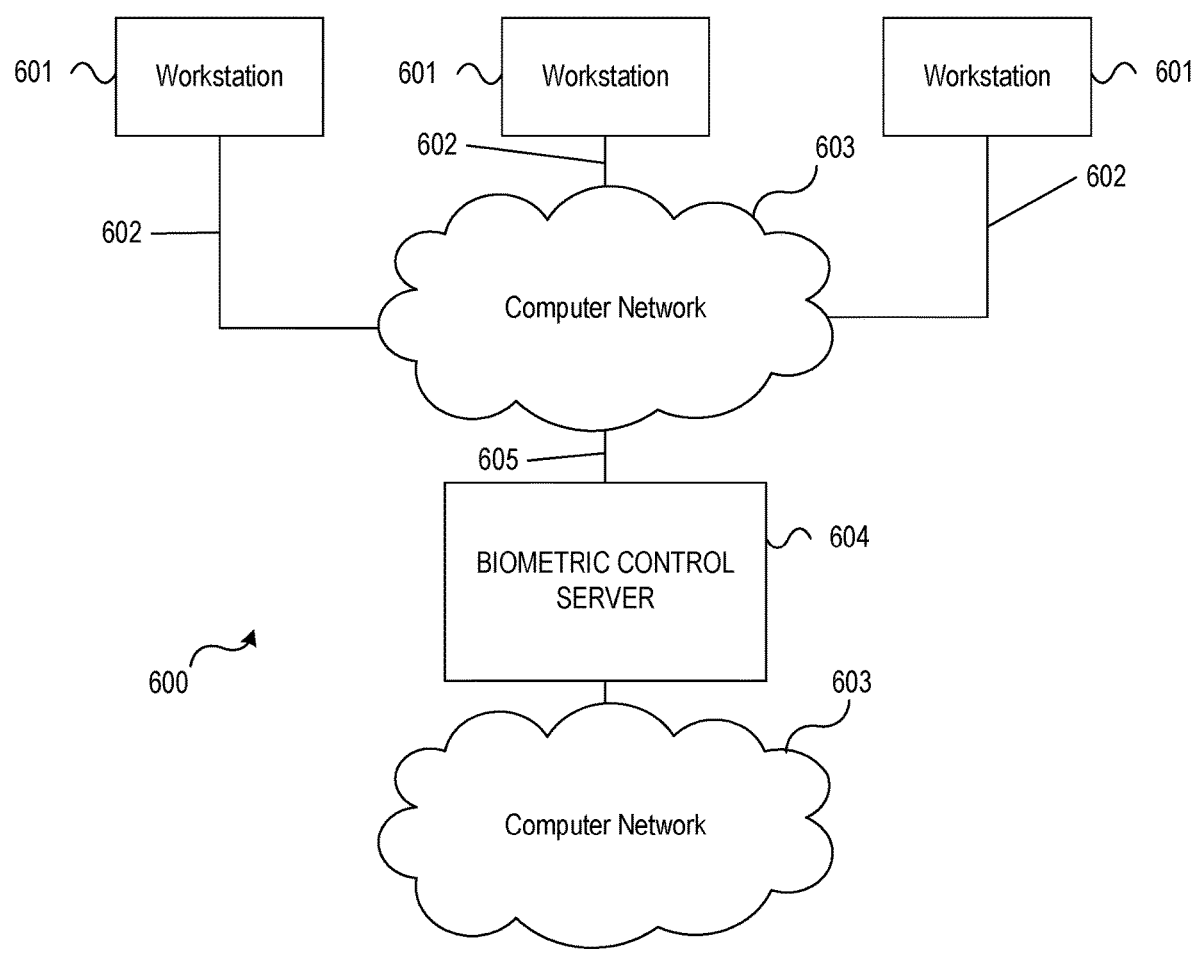
FIG. 6 depicts an illustrative block diagram of workstations and servers that may be used to implement the processes and functions of certain aspects of the present disclosure in accordance with one or more aspects described herein.

FIG. 6 depicts an illustrative block diagram of workstations and servers that may be used to implement the processes and functions of certain aspects of the present disclosure in accordance with one or more example embodiments. Referring to FIG. 6, illustrative system 600 may be used for implementing example embodiments according to the present disclosure. As illustrated, system 600 may include one or more workstation computers 601. Workstation 601 may be, for example, a desktop computer, a smartphone, a wireless device, a tablet computer, a laptop computer, and the like, configured to perform various processes described herein. Workstations 601 may be local or remote, and may be connected by one of communications links 602 to computer network 603 that is linked via communications link 605 to biometric control server 604. In system 600, biometric control server 604 may be a server, processor, computer, or data processing device, or combination of the same, configured to perform the functions and/or processes described herein. Server 604 may be used to receive registration data, receive user preferences, generate one or more biometric control rules, and the like.

Computer network 603 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 602 and 605 may be communications links suitable for communicating between workstations 601 and biometric control server 604, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing device, comprising:
   a touch screen display, the touch screen display including a biometric sensing region configured to detect biometric data on the touch screen display;
   at least one processor;
   a communication interface communicatively coupled to the at least one processor; and
   a memory storing computer-readable instructions that, when executed by the at least one processor, cause the computing device to:
      receive a request to execute an application;
      evaluate the application to determine whether enhanced security applies;
      responsive to determining that enhanced security does not apply, execute the application;
      responsive to determining that enhanced security does apply:
         execute one or more biometric control instructions associated with the application;
         execute the application with enhanced security;
         after executing the application with enhanced security, receive a first user input via the touch screen display, the first user input being received as a user interacts with the application;
         extract, from the first user input received as the user interacts with the application via the touch screen display, a first biometric data;
         compare the first biometric data to pre-stored biometric data of a registered user;
         determine, based on the comparing, whether the first biometric data matches the pre-stored biometric data of the registered user to perform an initial authentication of the user;
         responsive to determining that the first biometric data matches the pre-stored biometric data of the registered user, and as the application continues to execute, receiving and analyzing a second user input received via the touch screen display and received as the user continues to interact with the application via the touch screen display to perform a subsequent authentication of the user, wherein the second user input is received at a predetermined interval after the initial authentication; and
         responsive to determining that the first biometric data does not match the pre-stored biometric data of the registered user, executing one or more instructions modifying accessibility of the application.

2. The computing device of claim 1, wherein modifying accessibility of the application includes moving the application from a foreground of the computing device to operate in a background of the computing device.

3. The computing device of claim 1, wherein determining whether the first biometric data matches the pre-stored biometric data of the registered user includes determining whether the first biometric data matches at least a threshold percentage of points of the pre-stored biometric data.

4. The computing device of claim 1, wherein the biometric sensing region corresponds to at least 95% of the touch screen display of the computing device.

5. The computing device of claim 1, further including instructions that, when executed, cause the computing device to:
   responsive to determining that the first biometric data does not match the pre-stored biometric data of the registered user, executing one or more instructions modifying functionality of the application.

6. The computing device of claim 5, wherein modifying functionality of the application includes disabling one or more functions of the application.

7. The computing device of claim 1, wherein the pre-stored biometric data of the registered user is received during a registration process.

8. A method, comprising:
  receiving, by a computing device having a touch screen display including a biometric sensing region configured to detect biometric data on the touch screen display, at least one processor, and memory, a request to execute an application;
  evaluate, by the at least one processor, the application to determine whether enhanced security applies;
  responsive to determining that enhanced security does not apply, executing, by the at least one processor the application;
  responsive to determining that enhanced security does apply:
    executing, by the at least one processor, one or more biometric control instructions associated with the application;
    executing, by the at least one processor, the application with enhanced security;
    after executing the application with enhanced security, receiving, by the at least one processor, a first user input via the touch screen display, the first user input being received as a user interacts with the application;
    extracting, by the at least one processor and from the first user input, a first biometric data received as the user interacts with the application via the touch screen display;
    comparing, by the at least one processor, the first biometric data to pre-stored biometric data of a registered user;
    determining, by the at least one processor and based on the comparing, whether the first biometric data matches the pre-stored biometric data of the registered user to perform an initial authentication of the user;
    responsive to determining that the first biometric data matches the pre-stored biometric data of the registered user, and as the application continues to execute, receiving and analyzing, by the at least one processor, a second user input received via the touch screen display and received as the user continues to interact with the application via the touch screen display to perform a subsequent authentication of the user, wherein the second user input is received at a predetermined interval after the initial authentication; and
    responsive to determining that the first biometric data does not match the pre-stored biometric data of the registered user, executing, by the at least one processor, one or more instructions modifying accessibility of the application.

9. The method of claim 8, wherein modifying accessibility of the application includes moving the application from a foreground of the computing device to operate in a background of the computing device.

10. The method of claim 8, wherein determining whether the first biometric data matches the pre-stored biometric data of the registered user includes determining whether the first biometric data matches at least a threshold percentage of points of the pre-stored biometric data.

11. The method of claim 8, wherein the biometric sensing region corresponds to at least 95% of the touch screen display of the computing device.

12. The method of claim 8, further including:
  responsive to determining that the first biometric data does not match the pre-stored biometric data of the registered user, executing one or more instructions modifying functionality of the application.

13. The method of claim 12, wherein modifying functionality of the application includes disabling one or more functions of the application.

14. The method of claim 8, wherein the pre-stored biometric data of the registered user is received during a registration process.

15. One or more non-transitory computer-readable media storing instructions that, when executed by a computing device comprising at least one processor, memory, and a communication interface, cause the computing device to:
  receive a request to execute an application;
  evaluate the application to determine whether enhanced security applies;
  responsive to determining that enhanced security does not apply, execute the application;
  responsive to determining that enhanced security does apply:
    execute one or more biometric control instructions associated with the application;
    execute the application with enhanced security;
    after executing the application with enhanced security, receive, via a touch screen display of the computing device, the touch screen display including a biometric sensing region configured to detect biometric data on the touch screen display, a first user input the first user input being received as a user interacts with the application;
    extract, from the first user input, a first biometric data received as the user interacts with the application via the touch screen display;
    compare the first biometric data to pre-stored biometric data of a registered user;
    determine, based on the comparing, whether the first biometric data matches the pre-stored biometric data of the registered user to perform an initial authentication of the user;
    responsive to determining that the first biometric data matches the pre-stored biometric data of the registered user, and as the application continues to execute, receiving and analyzing a second user input received via the touch screen display and received as the user continues to interact with the application via the touch screen display to perform a subsequent authentication of the user, wherein the second user input is received at a predetermined interval after the initial authentication; and
    responsive to determining that the first biometric data does not match the pre-stored biometric data of the registered user, executing one or more instructions modifying accessibility of the application.

16. The one or more non-transitory computer-readable media of claim 15, wherein modifying accessibility of the application includes moving the application from a foreground of the computing device to operate in a background of the computing device.

17. The one or more non-transitory computer-readable media of claim 15, wherein determining whether the first biometric data matches the pre-stored biometric data of the registered user includes determining whether the first biometric data matches at least a threshold percentage of points of the pre-stored biometric data.

18. The one or more non-transitory computer-readable media of claim 15, wherein the biometric sensing region corresponds to at least 95% of the touch screen display of the computing device.

19. The one or more non-transitory computer-readable media of claim 15, further including instructions that, when executed, cause the computing device to:
   responsive to determining that the first biometric data does not match the pre-stored biometric data of the registered user, executing one or more instructions modifying functionality of the application.

20. The one or more non-transitory computer-readable media of claim 19, wherein modifying functionality of the application includes disabling one or more functions of the application.

21. The one or more non-transitory computer-readable media of claim 15, wherein the pre-stored biometric data of the registered user is received during a registration process.

* * * * *